Oct. 4, 1932.   J. A. BAKER   1,880,657

UNIVERSAL JOINT

Filed Dec. 5, 1931

Inventor
John A. Baker
By Spencer, Hardman and Fehr
Attorneys

Patented Oct. 4, 1932

1,880,657

UNITED STATES PATENT OFFICE

JOHN A. BAKER, OF DAYTON, OHIO, ASSIGNOR TO DELCO PRODUCTS CORPORATION, OF DAYTON, OHIO, A CORPORATION OF DELAWARE

UNIVERSAL JOINT

Application filed December 5, 1931. Serial No. 579,198.

This invention relates to improvements in ball and socket joints particularly adapted for use on shock absorber connecting links.

It is among the objects of the present invention to provide a shock absorber link having self lubricating ball and socket joints.

A further object of the present invention is to provide a shock absorber link with self adjusting ball and socket joints whereby to compensate for wear.

Another object of the present invention is to provide a shock absorber link of sturdy structure and design having self lubricating and self adjusting ball and socket joints which, in usage, require a minimum amount of care and attention.

These objects are attained by providing a ball shaped end on the one shaft; a hollow head on the other shaft adapted to receive said ball shaped end, a lining in said hollow head of metal fabric, a takeup spring interposed between the inner walls of the hollow head and the periphery of the lining adapted to press the latter into firm engagement with the ball end, spring means pressed against the exposed portion of the lining in the hollow head so as to effect substantial engagement of the take-up spring with the inner wall of the hollow head; and means retained in the hollow head for maintaining said spring means pressed against the lining as described.

Further objects and advantages of the present invention will be apparent from the following description, reference being had to the accompanying drawing wherein a preferred embodiment of one form of the present invention is clearly shown.

As has been mentioned heretofore the present invention relates to an improved ball and socket joint particularly adapted for use in shock absorber linkage. The shock absorber linkage is used to connect the operating arm of a shock absorber with an axle of the vehicle.

Figure 1:
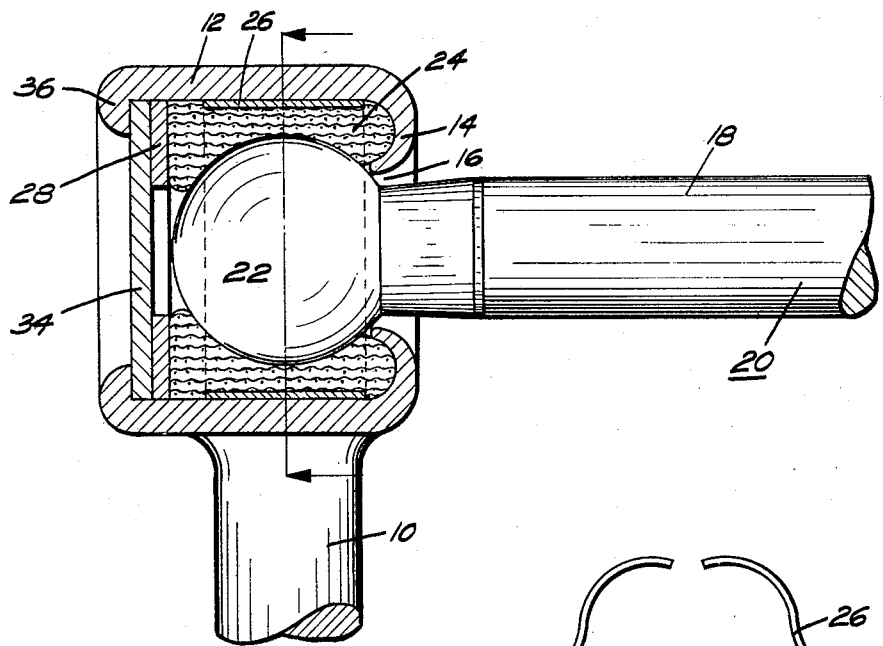
Fig. 1 is an enlarged sectional view of one of the ball and socket joints of a shock absorber linkage, the ball end of one of the sockets being shown in elevation.
Figure 2:
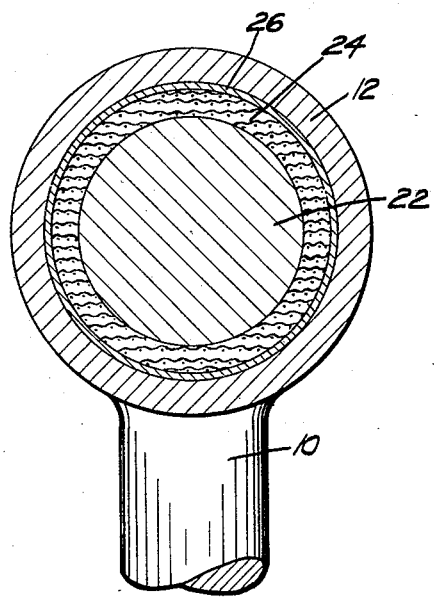
Fig. 2 is a sectional view taken substantially on line 2—2 of Fig. 1.
Figure 3:
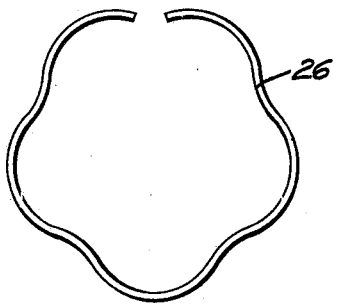
Fig. 3 is a detail view of the resilient take up device of the ball and socket joint.
Figure 4:
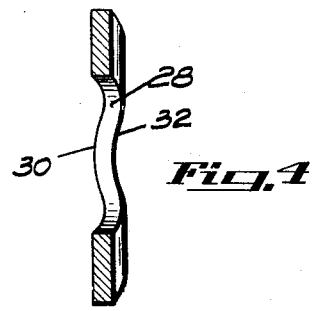
Fig. 4 is a sectional view through a preferred form of spring washer such as applied in the disclosed ball and socket joint.

In Figs. 1 and 2 a preferred form of ball and socket joint is illustrated. The rod or link 10 has a hollow head 12 secured thereto in any suitable manner, for instance by welding. The axis of this hollow head 12 is transverse to the axis of the link 10. One end of the hollow head 12 turns inwardly to form a flange 14, the inner edge thereof defining an annular opening 16. This opening is slightly larger in diameter than is the body portion 18 of a stub shaft 20, but smaller in diameter than a ball shaped end 22 of said stub shaft. The ball end 22 of the stub shaft 20 is received within the hollow head 12 of the link 10, the body portion 18 of the stub shaft being inserted through the opening 16, thereby positioning its ball shaped end 22 within the hollow head 12. A lining 24 of any suitable metal fabric, preferably brass wire cloth intermixed with lubricant such as powdered graphite or like lubricating substance is provided in the hollow head 12 and forms a bearing supporting the ball shaped end 22 of the stub shaft. A take-up spring 26 of any suitable type completely surrounds the lining 24 and is adapted firmly to press said lining against the ball shaped end 22. In the present instance this take up spring is an undulated leaf spring as shown in detail in Fig. 3. A spring washer 28 is pressed against the exposed portion of the lining 24, thereby compressing the lining and causing the same to fill out the space defined by the inner wall of the hollow head including the flange 14, the ball shaped end 22 and the spring washer 28 itself. A preferred type of spring washer is shown in detail in Fig. 4 whose planes 30 and 32 are undulated. The use of such spring washers has been found preferable because their resiliency is much longer lasting than that of any other well known type of spring washers. A cover plate 34 is superimposed upon the spring washer 28 and is adapted to maintain the spring washer 28 in pressure exerting condition by preventing the substantially prostrated spring washer from returning to its undulated form in which no pressure would be exerted upon the lining. The projecting end 36 of the hollow head 12 is bent inwardly so as to permanently secure the cover plate 34 thereto and particularly to maintain the spring washer 28 in the above described pressure exerting prostrated form.

The spring washer 28 which causes the lining 24 to expand, and therefore, urges the takeup spring 26 into substantial engagement with the inner wall of the hollow head 12 is when assembled substantially flat as already mentioned before, and the take-up spring 26, when urged against the inner wall of the hollow head 12 is substantially annular. When the spring washer 28 as well as the take-up spring 26 are thus deformed, then they both exert pressure continuously upon the lining 24, the take-up spring urging the latter into firm engagement with the ball shaped end 22 of the stub shaft and the spring washer not only resisting a yielding of the lining material under the pressure of the take-up spring but increasing the pressure of the lining against the ball shaped end 22 of the stub shaft. In this manner a firm and uniform engagement of the lining with the ball shaped end 22 of the stub shaft is obtained by two mechanical spring means each of which exerts pressure upon the lining in one certain direction only.

Should a portion of the lining through one reason or another be subject to greater wear than the rest of the lining, then the mechanical spring means self-adjust their exerting pressure so that as a result thereof the pressure of the lining upon the ball shaped end 22 of the stub shaft is uniform and therefore eliminates irregular wearing of the lining almost immediately.

The hard lubricant which is intermixed with the lining 24, lubricates the ball shaped end 22 of the stub shaft 20 and also reduces the friction between the brass wires of which the lining 24 consists. The lubricant which is distributed throughout the entire lining 24 has always a chance to reach the surface of the ball shaped end 22 of the stub shaft because the lining is sufficiently porous to allow the lubricant particles to stray under the more or less violent shocks occurring during the operation of the vehicle. It may thus be understood that in the space of time most all of the lubricant particles come in contact with the ball shaped end 22 of the stub shaft 20 but are soon pushed away by following particles of lubricant. In this manner a uniform gradual wear of the entire lubricant in the lining takes place and not an irregular wear of a part of the lubricant only in the case where the rest of the lubricant could not reach the ball shaped end and supplant the used lubricant.

In the present invention applicant has provided a ball and socket joint of a sturdy nature, capable of being used on a shock absorber connecting link. The ball and socket joint is so designed that it is protected against dust and dirt from the roadway over which the vehicle will be operated. The device is also self-lubricating and self-adjusting so that it will require a minimum amount of care and attention.

While the form of embodiment of the present invention as herein disclosed, constitutes a preferred form, it is to be understood that other forms might be adopted, all coming within the scope of the claims which follow.

What is claimed is as follows:

1. In a swivel joint between two power transmitting rods the combinaion of, a ball shaped end on the one rod; a hollow head on the other rod adapted to receive said ball shaped end; a porous lining in the hollow head of metal fabric; lubricant intermixed with said lining fabric; a take-up spring in the hollow head enclosing the periphery of the lining, adapted to compress the lining so as to firmly engage with the ball shaped end of the one shaft; a spring washer in the hollow head exerting pressure against the exposed portion of the lining thereby increasing the pressure in the lining and means retained in the hollow head for maintaining the spring washer in pressure exerting condition.

2. In a swivel joint between two power transmitting rods the combination of, a ball shaped end on the one rod; a hollow head on the other rod adapted to receive said ball shaped end; a lining in the hollow head of porous brass wire cloth; particles of graphite intermixed with the lining forming cloth; a take-up leaf spring in the hollow head closing the periphery of the lining and pressing the same into firm engagement with the ball shaped end of the one shaft; a spring washer in the hollow head exerting pressure against the exposed portion of the lining thereby effecting firm engagement of the take-up spring with the inner wall of the hollow head; and a plate retained in the hollow head for maintaining the spring washer in pressure exerting condition.

3. In a swivel joint between two power transmitting rods the combination of, a ball shaped end on the one rod; a hollow head on the other rod adapted to receive said ball shaped end; a bottom on the hollow head having an opening larger than the shaft but smaller than the ball shaped end thereof; a ring of brass wire cloth in said hollow head bearing against said flange; a take-up spring enclosing the ring, adapted to press the same into firm engagement with the ball shaped end of the one shaft so as to form a bearing for the same; a spring washer in the hollow head exerting pressure upon the portion of the lining opposite said bottom thereby causing the lining to yield the take-up spring into firm engagement with the inner wall of the hollow head; and a cover plate retained in the hollow head for maintaining the spring washer in pressure exerting condition.

In testimony whereof I hereto affix my signature.

JOHN A. BAKER.